Feb. 5, 1935.  W. B. LERCH  1,990,293
PROCESS FOR THE TREATMENT OF PETROLEUM EMULSIONS
Filed Oct. 14, 1929  2 Sheets-Sheet 1

Inventor
William B. Lerch,
By
Robt. E. Barry
Attorney

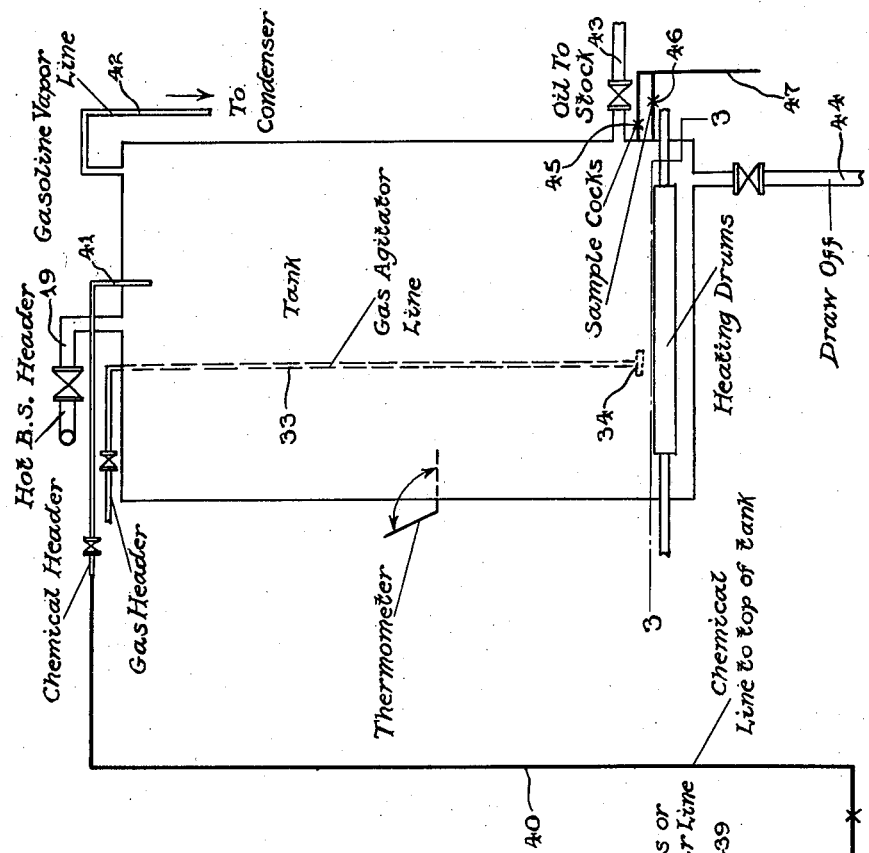
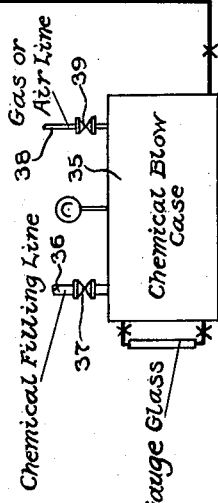
Fig. 2.
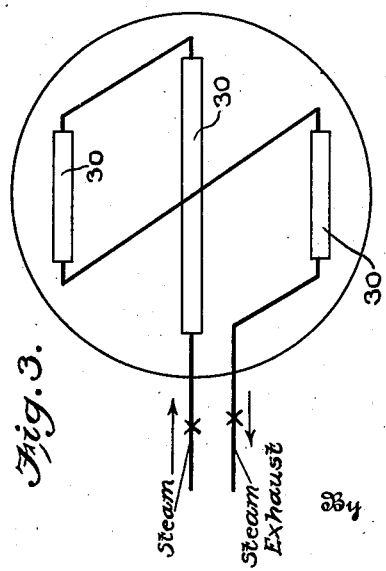
Fig. 3.

UNITED STATES PATENT OFFICE 1,990,293

PROCESS FOR THE TREATMENT OF PETROLEUM EMULSIONS

William B. Lerch, Bartlesville, Okla., assignor of one-half to Jack Stewart Dewar, Bartlesville, Okla.

Application October 14, 1929, Serial No. 399,666

2 Claims. (Cl. 196—4)

This invention relates to improvements in the processes and apparatus for the treatment or dehydration of emulsified petroleum, so called B. S. or bottom settlings, and particularly "tank bottoms".

The primary object of the invention is to provide an improved system for the batch treatment or dehydration of emulsified petroleum etc., so as to eliminate disadvantages found in the continuous treatment systems.

A further object is to furnish a treating system for this purpose, in which the mixture undergoing treatment is agitated by the use of a gaseous agent such as air.

A further object is to provide such a system in which the batch agitation by the use of a gaseous agent, may be practiced in the presence of salt water or a chemical treating agent or both.

Another object is to provide a system of this kind, in which the oily mixture, while undergoing agitation, is maintained at a temperature below 200° F., but preferably at a temperature ranging between 190° to 200° F. I also contemplate batch agitation at temperatures higher than 200° F., or just below the foaming temperature of the oil emulsion. My process can also be effectively practiced when the emulsion is cold or at atmospheric temperature but is more efficient when heat is used.

A still further object is to provide as a part of the process, a novel step of introducing chemical into the oil emulsion or the like, by the use of gas or air displacement, so as to eliminate pumping or pouring chemical into the top of the treating tank, as was done heretofore.

Other objects are to furnish a novel procedure for the removal of a specific amount of salt water from the bottom of the treating tank, prior to the removal of the treated oil, so that the treated oil may be removed from the tank without contamination by the salt water, silt, sand, dirt or the like; to allow for complete removal of all fluid from the treating tank after each treatment, thereby removing all trace of "sludge" to allow a subsequent treatment to be practiced in a clean unit; to permit preliminary heating of the emulsion or the like, and preliminary heating of the salt water, before agitation or comingling of the emulsion and salt water; and to allow for the recovery of gasoline vapors from the emulsion undergoing treatment.

A further object is to furnish a novel apparatus for use in practicing the process.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 2 is a side elevation of one of the treating tanks, and the chemical blow case for introducing a suitable chemical into the treating tank.

Fig. 3 is a horizontal sectional view on the line 3—3 of Fig. 2.

Figure 1:
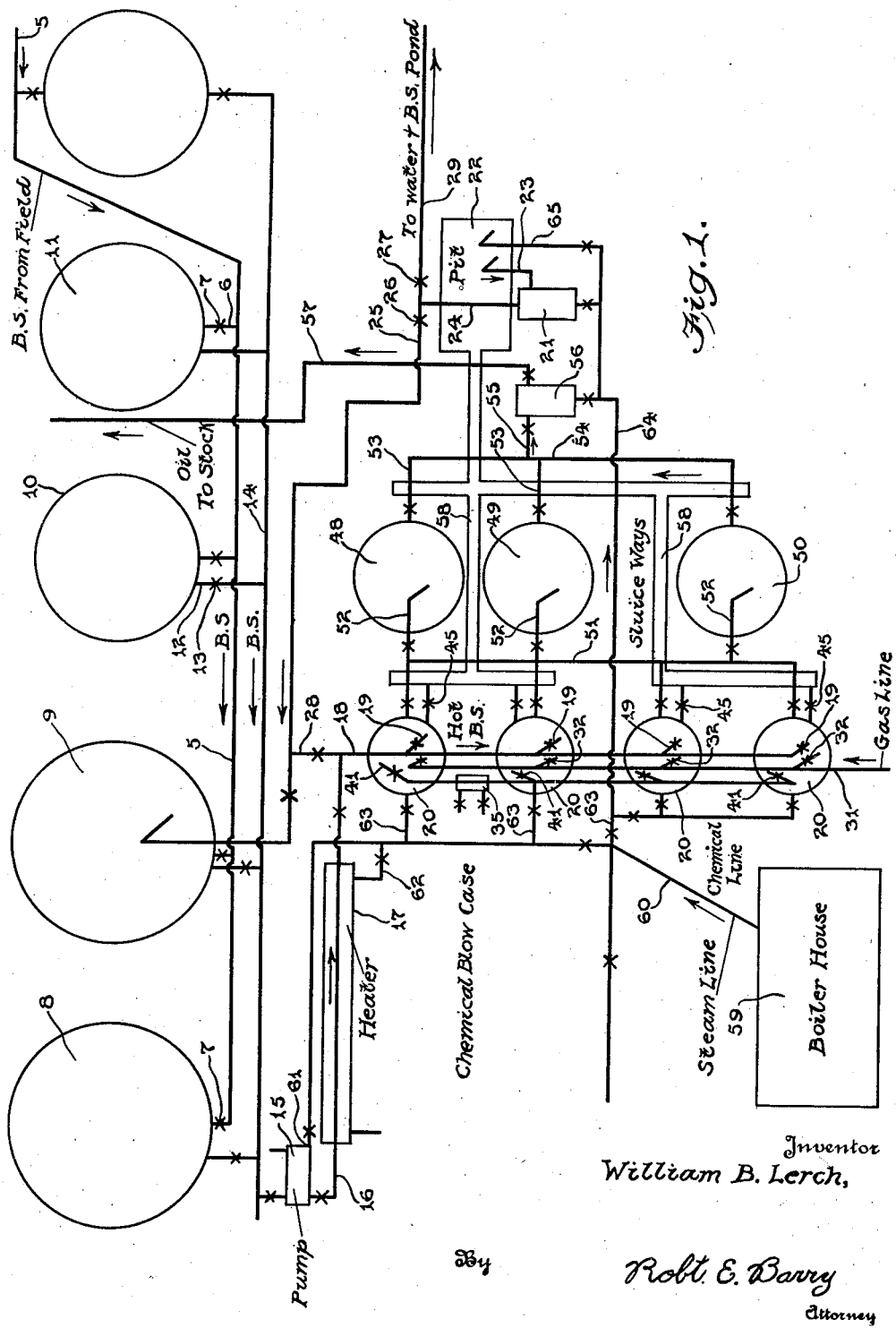
Fig. 1 is a diagrammatic top plan view of my improved apparatus.

In accordance with my invention, emulsified oil or B. S. from the field is introduced into the system through a pipe line 5, from which it is discharged through branches having hand valves 7 into stock tanks 8, 9, 10 and 11. The tanks 8 and 9 may be of 1600 barrel capacity, and the tanks 10 and 11, of 500 barrel capacity, as such tanks are usually present in the oil fields. Any convenient size stock tanks may be used.

The emulsified oil may be fed from one or more of these tanks, through branch pipes 12 having hand valves 13, into a conduit 14, which conveys the same to a pump 15 of any suitable type, but I prefer to use for this purpose, an ordinary so-called "mud-hog" steam pump, which is particularly designed to handle heavy fluids, and may vary in pumping capacity from several barrels to as much as 100 barrels or more per hour. This pump forces the emulsified oil or the like through a conduit 16, which extends through a heater 17, preferably of the ground type, and on the order of a heat exchanger, which is heated by means of steam. In this way, the emulsified oil or the like is heated to at least 190 to 200° F., and in its heated condition, it is forced by the pump 15, and from the line 16, into a pipe 18 which has valved branches 19 to admit the hot emulsified oil into one or more of the treating tanks 20.

At this point, it might be mentioned that each of the treating tanks may be made of any suitable material such as metal, and is preferably of about 210 barrel capacity. Each treating tank may be in the form of a vertically disposed cylindrical drum having a diameter of about one-half its height, and before the hot emulsified oil or the like is introduced into the same, salt water is fed in by means of a pump 21, which draws the salt water from a pit 22, through an inlet branch 23, and discharges the same into an outlet branch 24 that connects with a conduit 25 having hand valves 26, 27. When the valve 27 is closed, and the valve 26 is open, the pump may force the salt water into the pipe 25, which leads the same to a valved branch 28, connected to the pipe line 18 for feeding the salt water to one or the other of the treating tanks, but when the valve 26 is closed, and the valve 27 is opened, the pump 21 may force the salt water through a pipe 29 to the water and B. S. pond, (not shown).

As before stated, salt water is introduced into each treating tank before the hot emulsified oil or the like is introduced into the same, and such salt water will be deposited at the bottom of a tank to a depth of between two and three feet. Ordinary oil well brine may be used for this purpose.

Each treating tank, as best shown in Figs. 2 and 3, is provided in the bottom portion of the same with a horizontally disposed heating coil or heating drums 30, and by the use of such heating means, the salt water or brine, before the heated emulsified oil is introduced, is heated to a temperature between 190° and 200° F., and when such temperature is reached, the hot emulsified oil is allowed to flow into the treating tank, and to be deposited on the hot salt water or brine.

From Fig. 2 it may be seen that each branch pipe 19 through which the hot emulsified oil is introduced into its respective treating tank, is connected to the top of the tank.

The hot emulsified oil or the like is pumped into the treating tank, until the latter is filled to within two or three feet from the top, and then the flow of hot oil is cut off from that treating tank. Now the heater 30 in the tank is used to maintain the salt water and emulsion at a temperature preferably between 190 and 200° F.

While the entire body of the fluid is maintained at this temperature, a suitable gaseous agent, such as air or natural gas is forced into the treating tank for agitating purposes. To this end, a pipe line 31 leading from any suitable source of pressure gas or air, is joined to the tops of the treating tanks by means of valved branches 32, and the outlet end of each of these branches, as shown in Fig. 2, extends into the tank in a form of a down pipe 33 having an open ended T 34 at its bottom for discharging the gaseous agent into the tank fluid at a point in close proximity to the bottom of the tank. The T gives the agitating air or gas an outward and upward direction of flow through the fluid, and when the entire fluid in the treating tank reaches the desired temperature, i. e., 190° to 200° F., sufficient air or gas is released from the T 34 to cause agitation or a rolling action of the entire body of fluid. In fact, agitation in this manner is carried on with sufficient force for about five minutes, or until the salt water or brine which was originally in the bottom of the tank, is thoroughly mixed throughout the entire pool of fluid.

After said five minute period, and while the agitation is continuing through the introduction of the gaseous agent, a suitable chemical is added to the fluid in the treating tank. For this purpose, I prefer to employ a chemical blow case 35 (which is preferably a closed metal tank of about ten gallons capacity) and adapted to be substantially filled with a liquid chemical agent through an inlet pipe 36, having a valve 37. After the blow case has been substantially filled with the chemical agent, a pressure gas or air is introduced into the top of the blow case, through a pipe 38 having a valve 39, and this gaseous pressure medium forces the chemical agent through a valved pipe 40 that is connected by valved branches 41 to the tops of the treating tanks 20. Each of these valved branches depends into the top of its respective treating tank for about a foot, as shown in Fig. 2.

Returning now to a tank of fluid undergoing treatment, it will be understood that through the use of the blow case 35, the desired measured quantity of the chemical agent is introduced into the treating tank by air or gas displacement, and this eliminates the pumping or pouring of the chemical into the top of the tank, as was heretofore done.

A period of five to ten minutes is required to introduce the desired amount of chemical, and the agitation with air or gas not alone takes place while the chemical is introduced, but it is continued for several minutes after the introduction of the chemical.

At this time, the gaseous agitating agent, as well as the heat is cut off from the treating tank, and the fluid is then allowed to settle without further disturbance, and usually the resolution of the original emulsion into pipe line oil and water, will be completed within several hours after agitation has ceased.

During the process of heating, agitating and settling, any light hydrocarbon vapors which rise to the top of the tank, are permitted to discharge through a vapor line 42 which leads the same to a suitable condenser (not shown), to permit the vapors to be condensed into gasoline.

In the treatment of emulsions, particularly "tank bottoms", there is usually produced a small amount of inorganic silt, sand, or dirt which was produced with the oil. In the treatment of "tank bottoms" in accordance with my invention, this sand, dirt, etc., concentrates in the treating tank in the form of a sludge stratum, which occurs at the end of the settling, between the top of the water line and the bottom of the purified or merchantable oil stratum. It is essentially a part of my process to remove all of the foreign material or sludge stratum from the treating tank in each batch, before proceeding with the treatment of the next batch. In order to do this, each treating tank is provided with a four inch valved merchantable oil transfer branch 43, leading from a side of the tank, and located approximately thirty inches from the bottom of the latter. The bottom of each treating tank is also provided with a four inch valved drain or draw-off pipe 44.

Two sample cocks are arranged at the side of the tank, and are located beneath the branch 43, one of these cocks 45 is located about four inches beneath the branch 43, and the other, 46, about eight inches below the branch 43, and both of the cocks may lead into a common sample tube 47.

When it is desired to transfer the treated oil from a treating tank, I first draw off a sufficient amount of water through the pipe 44 until the top of the sludge stratum is found to be four inches below the branch 43, or into horizontal alignment with the cock 45. This operation causes the merchantable oil line to extend four inches below the branch 43, and when the valve in the latter is opened, the treating tank may be emptied of all merchantable oil, with the exception of the four inches of good oil below the branch 43.

After the transfer of the merchantable oil is completed, all of the balance of the water, and all of the sludge or unresolved B. S. is removed through the draw-off pipe 44, and the sludge follows the water out of the tank. However, the above mentioned four inches of merchantable oil is allowed to remain in the tank, and to form part of the next batch that is treated. For example, after the removal of the water and sludge, and the closing of the valve in the pipe 44, the required amount of salt water is next pumped into the treating tank by way of pipes 28 and 18, and then the hot emulsion is introduced and the fluid in the tank is prepared for the next batch treatment.

It will be observed that the treating tanks are elevated about eight to ten feet from the ground surface, so that the merchantable oil discharged through the branches 43, may flow by gravity into receiving tanks 48, 49 and 50, arranged at a lower elevation. To permit the merchantable oil to flow from either one of the treating tanks to either one of the receiving tanks, the branches 43 are preferably connected to a manifold 51 that is joined by valved branches 52 to the tops of the receiving tanks. Each of the latter tanks is preferably of 250 barrel capacity, and the treated oil may be transferred from the same through valved branches 53 which lead into a manifold 54 that is connected by a valved conduit 55 with a transfer pump 56, which may be employed to force the merchantable oil through a pipe 57 leading to stock tanks, for instance, not shown.

Provision is made in the form of the sump pit 22 to recover the salt water removed from each batch treatment, so that the same may be used over and over again. To permit this, the draw-off branches 45 from the bottoms of the treating tanks, lead into sluice ways 58, which discharge into the pit from which the salt water may be drawn by the pump 21.

Any suitable means may be used for heating the heaters 17 and 30, but I prefer to heat by means of steam which is led from a boiler house 59, through a steam line 60 that connects directly at the point 61 with the pump 15 for actuating the latter, and connects by a valved branch 62 to the heater. Valve branches 63 join the steam line to the heating drums 30, and one of these branches extends as shown at 64 to the pumps 56 and 21 for actuating the latter, and if desired, some of the steam may be led by a branch 65 into the pit 22.

In carrying out my process, it is optional to use any chemical or treating compound which may be found satisfactory in resolving the type of emulsion being handled. I prefer to use a 50% gasoline solution of a satisfactory chemical which may be introduced into any one of the treating tanks by means of the blow case 35.

In practicing the process, emulsified oil or the like is heated to at least 190 to 200° F., as it is pumped through the heater 17. Assuming I use a 210 or 250 barrel capacity treating tank, I pump the hot emulsified oil through the heater and into the treating tank at a rate dependent upon the size of the steam pump used. I usually deliver the hot emulsified oil into the treating tank at the rate of 100-150 barrels per hour, and before starting to fill the treating tank with the hot emulsified oil, I first heat the two or three feet of salt water in the tank to between 190 and 200° F. The hot emulsified oil is then pumped into the treating tank to within two or three feet from the top, a total pumping time of approximately two hours being required. I endeavor to pump the emulsified oil into the tank at as nearly a temperature of 200° F. as may be controlled. Therefore, when the tank is filled with hot emulsified oil, the temperature of the same does not vary from the desired treating temperature, that is, 190-200° F., and treatment is commenced without delay.

It is believed that the time element involved during agitation and actual treatment of the emulsion has hereinbefore been sufficiently explained, and after the chemical agent has been added, and agitation is completed, the fluid is allowed to settle and cool without further disturbance. Depending upon the type of emulsion treated, the time required for the resolution of the emulsion into pipe line oil and water, may vary several hours. However, this resolution is usually completed within a maximum of five or six hours. In most instances, however, I allow the fluid in the treating tanks to settle for at least twelve hours, which not only provides ample time for a complete resolution of the oil and water, but also allows the pipe line oil to cool to a temperature sufficiently low, (100-110° F.) to be run as merchantable oil.

For example, assuming I fill a treating tank with hot emulsified oil and commence treatment in the late afternoon (4:00 P. M.), this entire procedure of filling the treating tank and actual treating does not require more than two or three hours time. I then allow the fluid to settle during the night, and the next morning, about seven A. M., I drain a sufficient amount of salt water from the bottom of the tank until the merchantable oil bottom line is four inches below the oil transfer branch 43. The good oil is then removed by flowing the same by gravity into one or the other of the receiving tanks. After this operation, the treating unit is completely emptied of all of the remaining salt water and sludge, and is then ready to be refilled with salt water and emulsion as before.

It is optional in some cases, to use hot salt water or brine in connection with the treatment. Some emulsions contain a large percentage of water, which, of course, settles out during treatment, and in such cases, when the water content of the emulsion is sufficiently high, I find it unnecessary to use salt water. When this procedure is practiced, I simply fill the treating unit 20 to the desired level with the hot emulsion only, and then proceed in the same manner, just as though salt water had been admitted into the bottom of the tank before the introduction of the emulsion.

There are cases in the handling of certain high water content emulsions, where a cleaner resolution of the emulsion into oil and water occurs, when additional salt water is not added in the tank from the start. When this happens to be the case, it is obviously not helpful to the process to add salt water to the tank 20 before treatment commences, although the addition of the same would neither particularly help or hinder the desired results, but would mainly be a waste of space in the tank, which could be profitably utilized by adding additional emulsion.

A salient advantage of my type of batch treatment or process is obtained by the means 45, 46, 47 providing for sampling the emulsion from each batch before the chemical treatment. Examination of a sample by such means usually discloses the actual quality and characteristics of the emulsion, and enables the treatment of the same to be more definitely controlled, mainly with regard to temperatures, amount of chemical to be used, time of agitation, settling time, etc. It is desirable to know the exact amount of chemical to be used, and such means acts as an indicator in this respect. As the chemicals employed are usually very expensive, and in continuous processes of treating emulsions, particularly "tank bottoms", it is not altogether possible to control the amount of chemical required and consumed, it will be manifest that my invention has advantages over continuous processes. It is evident in comparing the chemical treating cost of various types of installations, that too large an amount of chemical is consumed compared to the actual amount that would do the same work under more definite control, and by means of my invention, such control may be obtained.

While I have disclosed the invention in such manner that it may be readily understood by those skilled in the art, I am aware that various changes may be made in the details disclosed without departing from the spirit of the invention, as expressed in the claims.

What I claim and desire to secure by Letters Patent is:

1. In a process of the character described, discharging salt water from the bottom portion of a chamber, utilizing a fluid stream to indicate when the desired amount of salt water has been released from the chamber, then stopping the discharge of salt water from the chamber, permitting during the discharge of the salt water, a stratum of oil superposed on the water to descend within the chamber until the bottom line of the oil stratum descends below a certain elevation, and finally discharging the major portion of the oil from the chamber through an outlet arranged at said elevation.

2. In a process of the character described, permitting a fluid mixture in a chamber to settle into superposed strata of salt water, sludge and oil, then withdrawing some of the salt water from the bottom of the chamber and permitting the bottom line of the oil stratum to descend below a certain elevation, then discharging the major portion of the oil from the chamber through an outlet arranged at such elevation, and finally discharging the remainder of the salt water and the sludge from the bottom of the chamber while preventing the remainder of the oil from discharging from the bottom of the chamber.

WILLIAM B. LERCH.